Sept. 16, 1969 T. F. DROEGE ETAL 3,467,820

PUNCHED RECORD READER

Filed June 8, 1965 4 Sheets-Sheet 1

INVENTORS
THOMAS F. DROEGE &
WILLIAM D. NELSON
BY
Brumbaugh, Free, Graves & Donohue
their ATTORNEYS

PUNCHED RECORD READER

Filed June 8, 1965 4 Sheets-Sheet 2

INVENTORS
THOMAS F. DROEGE &
WILLIAM D. NELSON
BY
Brumbaugh, Free, Graves & Donohue
their ATTORNEYS INVENTORS
THOMAS F. DROEGE &
WILLIAM D. NELSON
BY
Brumbaugh, Free, Graves & Donohue
their ATTORNEYS INVENTORS
THOMAS F. DROEGE &
WILLIAM D. NELSON
BY
Brumbaugh, Free, Graves & Donohue
their ATTORNEYS 3,467,820
PUNCHED RECORD READER
Thomas F. Droege and William D. Nelson, Kendall Park, N.J., assignors to Applied Logic Corporation, Princeton, N.J., a corporation of New Jersey
Filed June 8, 1965, Ser. No. 462,370
Int. Cl. G06k 7/00
U.S. Cl. 235—61.11 15 Claims

ABSTRACT OF THE DISCLOSURE

A punched record reader is described herein and comprises a plurality of thin plates spaced relatively close to each other and mounted in a receptacle having retaining means and ejecting means for the record. Each plate carries, on its thin edge, a plurality of photocells associated with appropriate electric circuits for detecting the punched holes in the record.

This invention relates to punched record readers and, more particularly, to a novel and improved punched record reader of the type in which the record is held stationary while the information on it is detected.

While the most commonly used punch record readers are of the type in which the records such as a tape or cards are read as they move past a row of mechanical switches or photocell detectors, another type of reader detects the information while the record is held stationary. Many presently known readers of the latter type employ mechanical switching elements which are closed by the movement of pins or brushes through the punched holes into the card. The use of mechanical switching and the auxiliary mechanisms for moving a carriage into and out of operating position has a number of disadvantages. For one thing, the switches and other mechanisms are often complicated and expensive. Moreover, because the many hundreds of moving parts are subject to sticking, breakage and wear, the devices are often unreliable in operation, and maintenance and repair costs are relatively high. Further, the entry of the switch pins or brushes into the card holes can damage the cards or tape and quickly wear them out when they are used repeatedly.

It has heretofore been suggested that photocells can be used in readers, not only for moving records, but for stationary ones as well, but certain difficulties have been encountered. One significant problem is to physically accommodate the photocells close enough together to read every information position in a record and to connect the photocell outputs, either in a matrix or individually. Thus, readers for stationary cards suggested heretofore have been capable of reading only a limited number of punched holes which are relatively widely spaced from each other.

The above-mentioned and other disadvantages of punched record readers of the type in which the records are held stationary while the information is detected are overcome, in accordance with the invention, by a novel and improved reader which comprises a plurality of substantially parallel, spaced-apart plates of nonconductive material, each of which carries a number of spaced-apart photocells along one edge. The plates are mounted so that the photocells are arranged in a plane and in columns and rows to provide an array covering every information position on a particular type of card. For example, the reader may be arranged to detect every punched position in a standard IBM card, one photocell-carrying plate being aligned with each column of the card and photocells being located on each plate to detect all punch positions in each column.

Each of the plates is provided with printed circuit conductors forming conductive paths between each of the photocells and points adjacent the perimeter of the plate. In a preferred embodiment of the invention, one side of each plate has conductors extending from each of the photocells to points spaced along an edge opposite the photocells and the other side of the plate is provided with a common conductor which is connected by separate branches to each of the photocells. The common conductor leads out to a point adjacent one corner of the plate. This arrangement permits the conductors for each row of photocells in the array to be connected together and the common conductors to be separately connected so as to form a matrix. In this embodiment of the invention, the punched record is read out column by column by sequentially switching in each column and reading out all the rows.

An important feature of the preferred embodiment described above is that the corner of each of the photocell-carrying plates opposite from the corner to which the common printer conductor leads is cut away diagonally and the plates are positioned so that the diagonal corners are located, alternately, on one side and then the other side of the array. Thus, every other plate on each side of the reader is cut away while the intermediate plates on the same side receives wires for connecting the common connector of each plate to a computer input or the like. The above-described arrangement of the cards considerably facilitates connecting the photocells and enables the photocell-carrying plates, and thus the photocells, to be positioned close enough to each other to enable reading every information position.

In another embodiment of the reader, the plates carrying the photocells are provided with printed circuit conductors leading between each of the photocells and points at an edge of the plate intersecting the edge on which the photocells are mounted. Further, the conductors are arranged to provide a separate conductive path to and from each photocell. The adjacent cards are arranged in alternate positions so that one plate has the conductors terminating one side of the reader and the next plate has the conductors terminating along the other side. As with the conductors in the first embodiment, the arrangement of the cards in the above-described manner considerably facilitates connecting the printed circuit conductors to input wiring. In this embodiment, however, each of the photocells can be separately connected to the input of a computer or the like, rather than in a matrix. Thus, all information positions on a record can be detected simultaneously.

Adjacent the array of photocells of the reader is a receptacle for receiving a punched record, and apparatus is provided for holding the record in place. Preferably, an ejector is included so that if the record, such as a card, is not properly inserted into the reader, it will not stay in place, thus giving notice to the user that the card is not properly oriented, and so that the card can be easily removed after use.

The reader includes a light source to illuminate the photocells and circuitry for maintaining the photocell outputs at a desired level. This circuit operates by varying the intensity of the light source in accordance with the output of a sample photocell, which may be one in the array. The records to be read are punched to provide a hole for the sample photocell, and the output from that photocell is then used by a regulator to adjust the light intensity.

For a better understanding of the invention, reference may be made to the following description of an exemplary embodiment, taken in conjunction with the figures of the accompanying drawings, in which.

Figure 2:
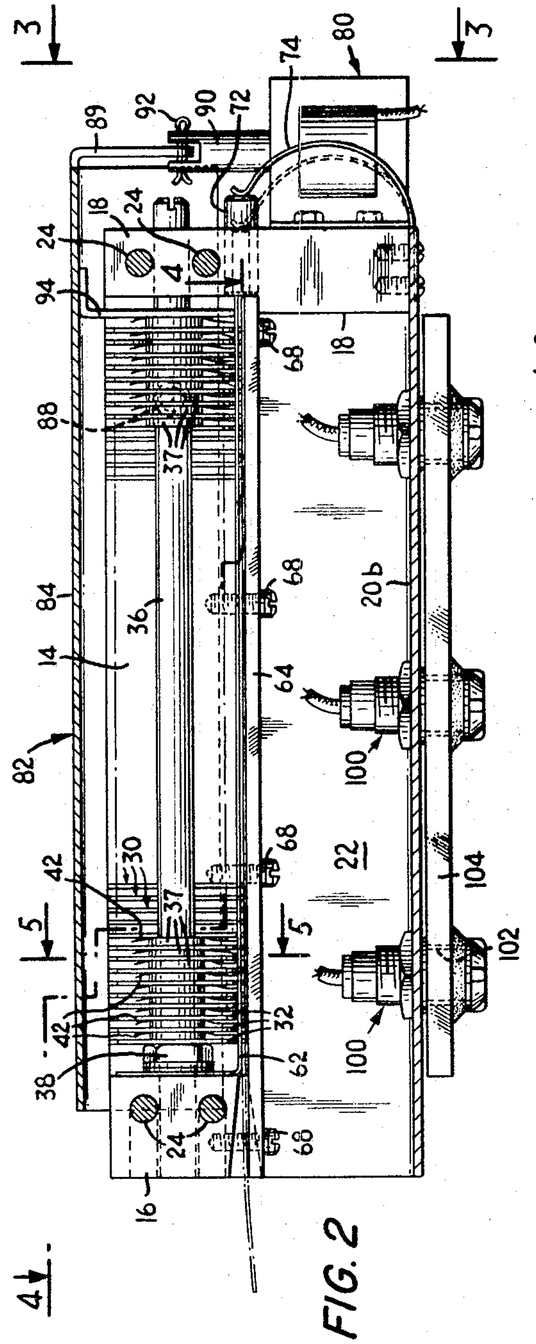
FIG. 2 is a side view in section of the reader of FIG. 1 taken generally along the line 2—2 of FIG. 1 and in the direction of the arrows.
Figure 1:
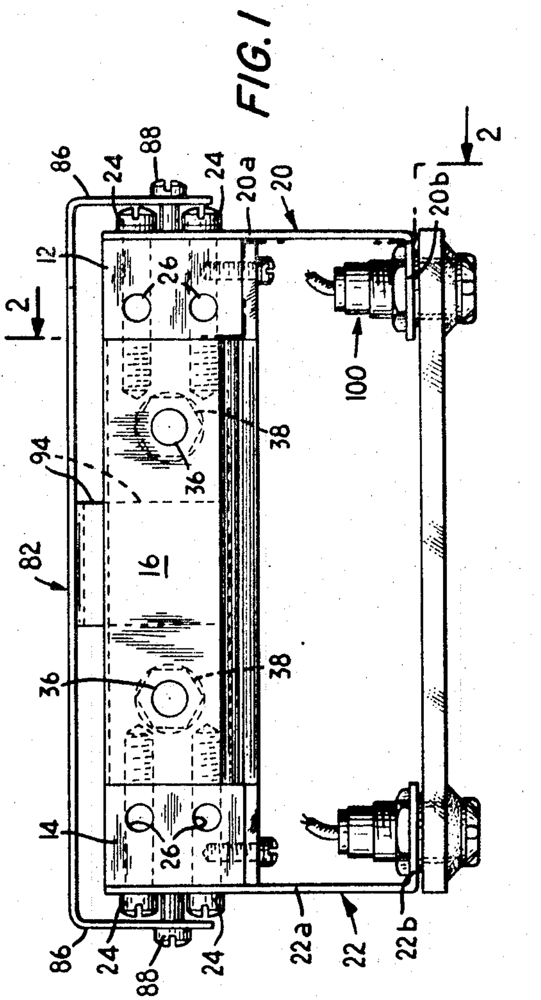
FIG. 1 is a front elevation view of the embodiment.
Figure 3:
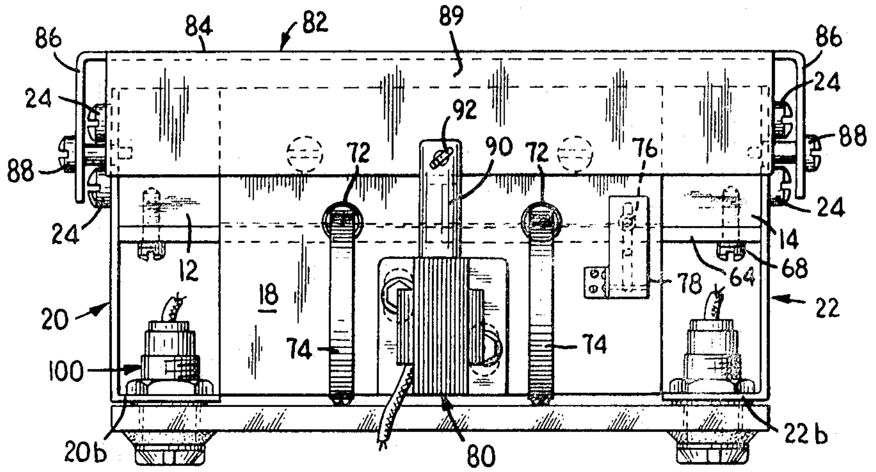
Figure 7:
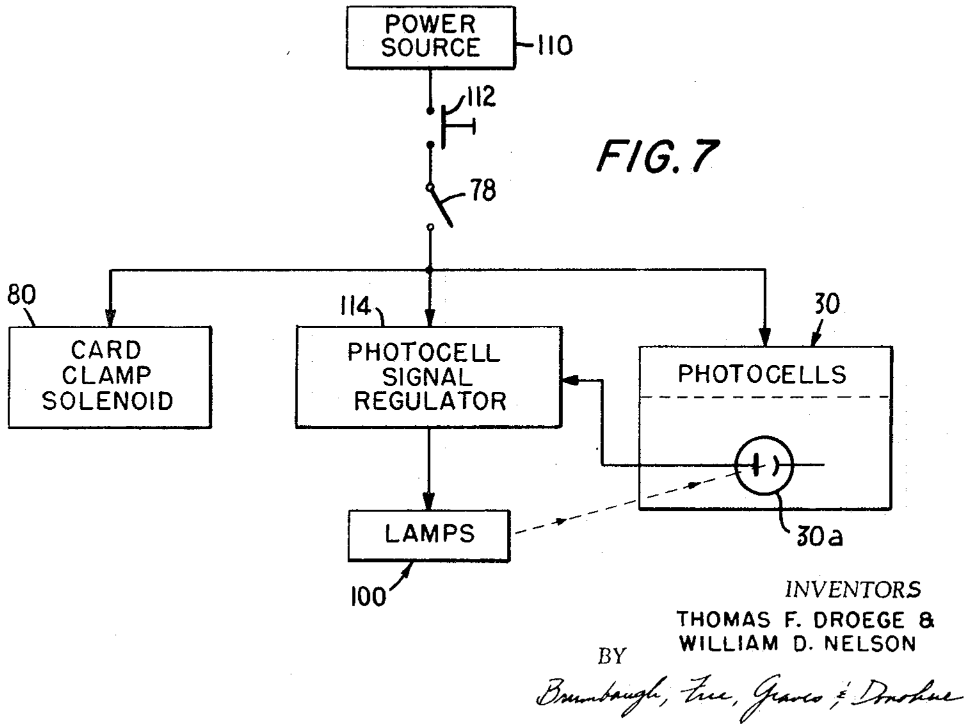
Figure 4:
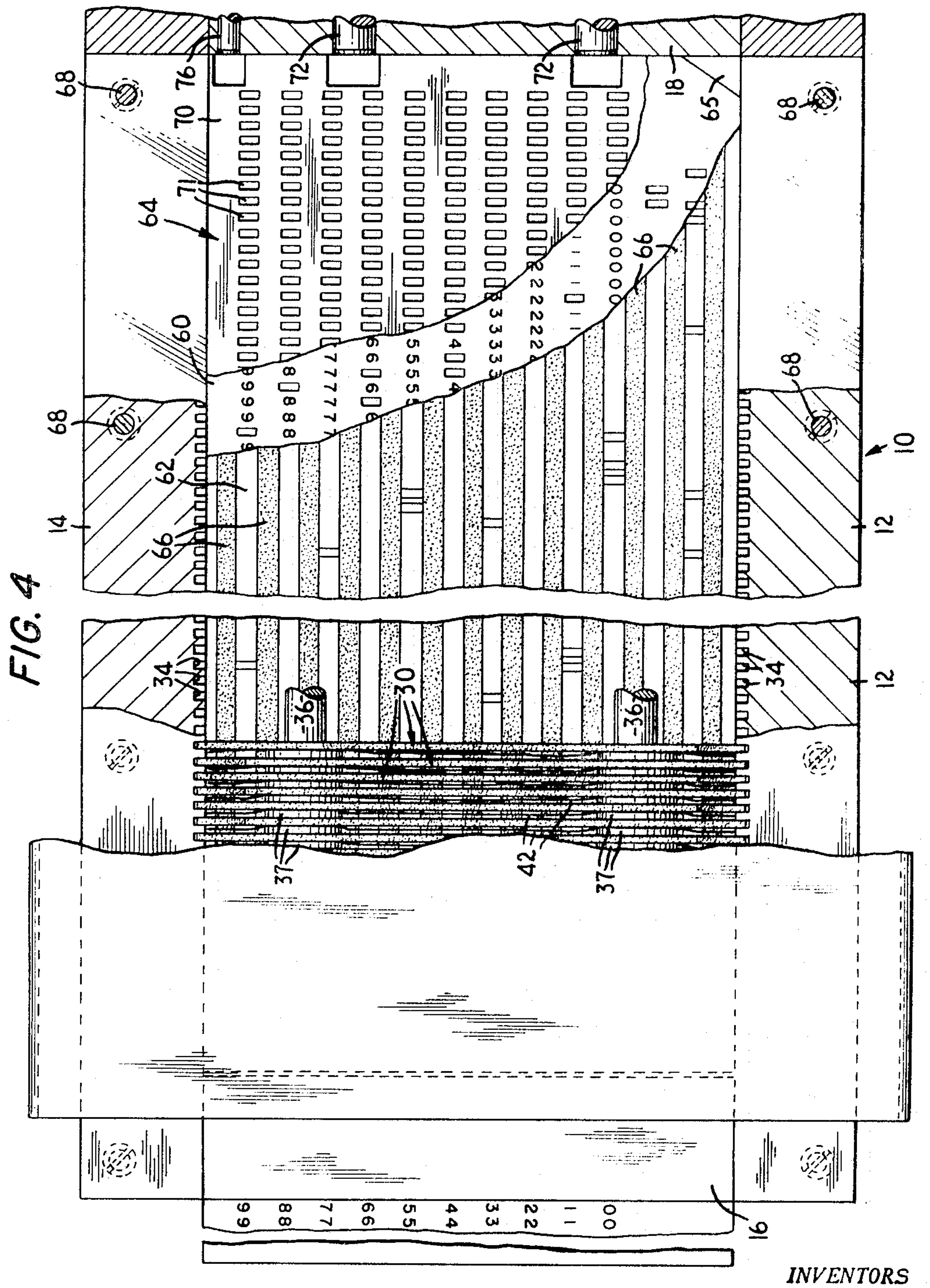
Figure 5:
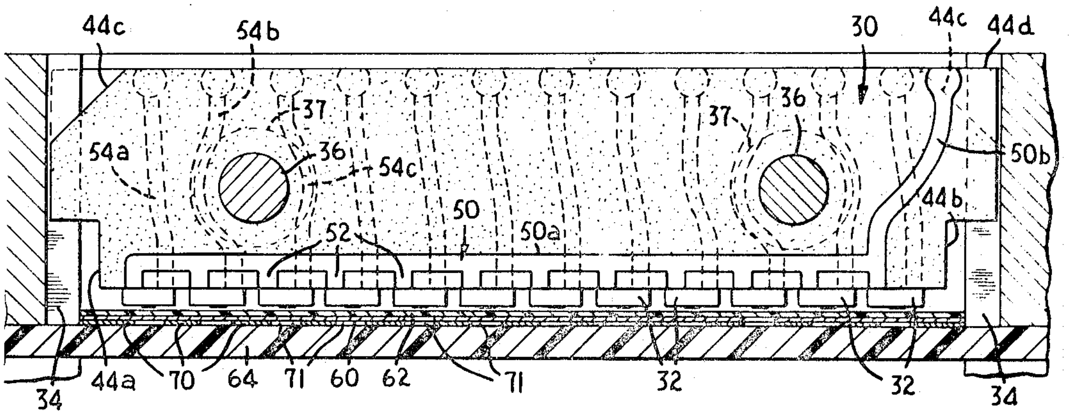
Figure 6:
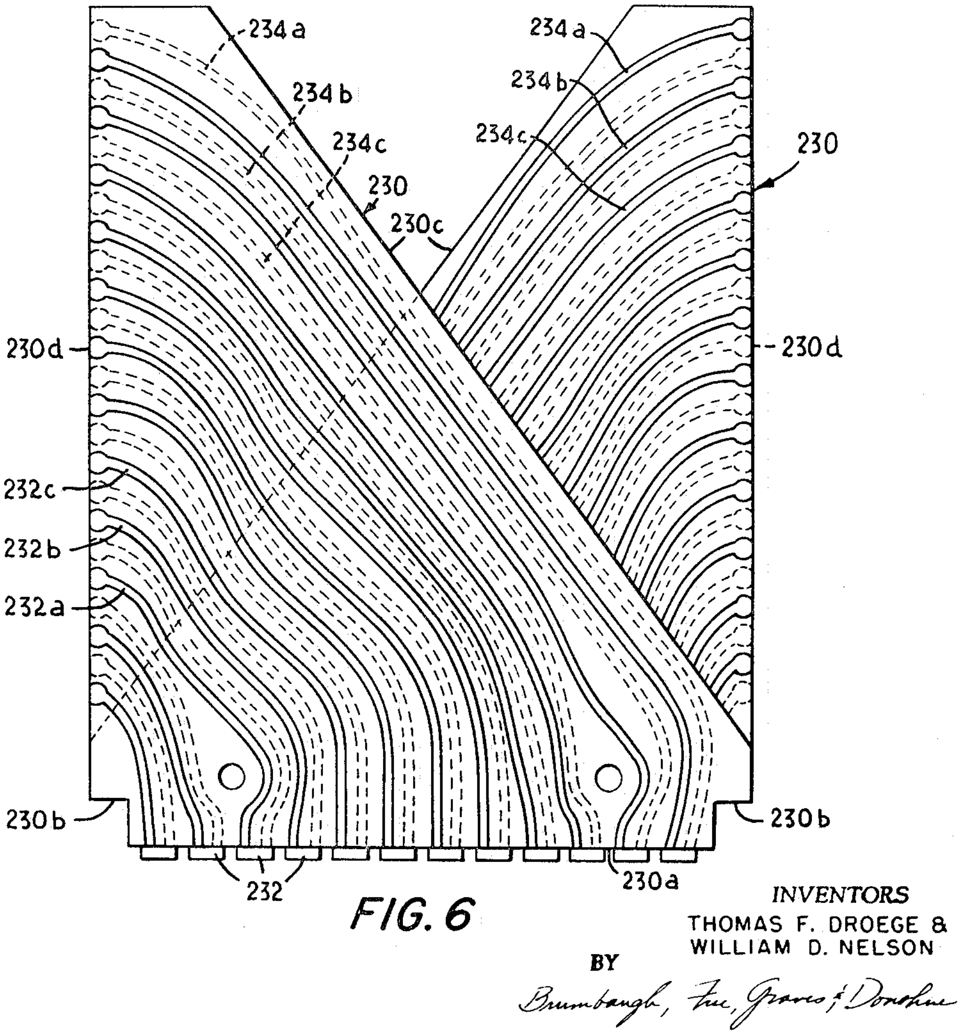

FIG. 3 is a rear elevation view of the reader of FIG. 1;

FIG. 4 is a top view of the reader of FIG. 1, the view being on a larger scale, a center section of the reader being omitted, and portions of the reader being successively broken away, as represented by the line 4—4 of FIG. 2, to more clearly illustrate the interior construction;

FIG. 5 is an end view in section of the upper part of the reader, the view being on a relatively larger scale and taken along the line 5—5 of FIG. 2;

FIG. 6 is a plan view of an alternative embodiment of the printed circuit plates which carry the photocells, the view being on a reduced scale relative to FIG. 5, for example; and FIG. 7 is a block diagram of the control circuits of the reader.

Referring to FIGS. 1 to 4, the reader has a body or frame 10, which is generally rectangular in plan, and is made up of longitudinal members 12 and 14, a front end member 16, and a rear end member 18. The longitudinal members and the front member have the same vertical dimension but the rear end member 18 extends down somewhat below the other three members. Extending the entire length of the longitudinal members are brackets 20 and 22 which include portions **20*a* and 22*a* forming side walls for the reader and inturned flanges 20*b* and 22*b*. The longitudinal frame members 12 and 14 and the brackets 20 and 22 are fastened to the ends of the end members 16 and 18 by cap screws 24. As best shown in FIG. 1, the front ends of the longitudinal members 12 and 14 are provided with threaded holes 26** for receiving screws for mounting the reader behind a panel.

Referring to FIGS. 2 and 4, the space defined within the frame members 12, 14, 16 and 18 receives a plurality of plates 30 of nonconductive material, each of which carries a number of photocells 32 along its lower edge. The plates 30 are mounted in slots 34 formed in the inner faces of the longitudinal frame members 12 and 14 and on longitudinally extending rods 36 which are received through holes in the rear end frame member 18, threaded into the front end member 16 and locked in place by bolts 38. Longitudinal displacement and warping of the center portions of the plates 30 is prevented by spacers 37 carried on the rods 36 between the plates. Alternatively, a longitudinally extending, slotted separator plate can be used. Between each pair of plates 30 are opaque sheets 42 made of a material such as, fish paper which prevent the communication of light between the photocells on adjacent plates.

Referring to FIG. 5, all of the plates are the same. They are generally rectangular in shape, except that the lower corners are cut away to leave right angle notches **44*a* and 44*b* and one upper corner is cut off to provide a diagonal edge 44*c*. The surfaces of the plates 30 have printed circuit conductors on them which provide conductive paths between each of the photocells 32 and points adjacent the perimeters of the plates. More particularly, one surface of each of the plates 30, as illustrated by the plate in FIG. 5, has a common conductor 50 which consists of a horizontal portion 50*a*, diagonally extending portion 50*b* leading to the sharp corner 44*d* of the plate, and a plurality of branches 52, one branch connecting each of the photocells 32 to the horizontal portion. The other surface is provided with conductors 54*a*, 54*b*, 54*c* etc., leading generally vertically from each photocell 32** to equally spaced-apart points adjacent the upper edge of the plate.

In the embodiment of the card illustrated in the drawings, the plates 30 are made of resin-impregnated fiber glass coated on both sides with copper. The copper is etched away to leave the conductors. The photocells 32 along the lower edges of each plates 30 are of known, commercially available types and comprise a base of ceramic material, a photoconductive material, specifically cadmium sulfide, deposited on one side of the base, and conductive material on the edges leading from the photoconductive material. The photocells 32 are connected electrically and physically to the ends of the printed circuit conductors on the plates 30 by soldering the conductive material of the photocells to them. The photocells and the entire lower portions of the plates 30 are coated with a clear potting compound to protect them from scratching and other physical harm and to prevent intrusion of dirt and moisture.

A card reader having the type of plates illustrated in FIG. 5 is wired to read the punched card column by column by connecting the corresponding conductors **54*a*, 54*b*, 54*c*, etc., of each plate together, thereby establishing a common bus wire for each row of photocells. Further, every other plate is installed in the reader frame with the diagonal corner 44*c* at the same side, while the remaining plates are reversed end for end so that the notched corners 44*c* are at the opposite side of the reader. Accordingly, the end of the common conductor diagonal portion 50*b* of each plate extends outwardly beyond the diagonal edges 44*c* of the plates on either side so that sufficient space is left to enable a wire to be soldered to it. Half of the wire leads from the conductor portions 50*b*** thus emerge from each side of the plate array. In the drawings, the output wiring which connects the printed circuit conductors on the plates is omitted for clarity of illustration. The wiring is brought out to a plug-connector mounted on the reader frame to facilitate connecting the reader to other apparatus such as a computer input or data processing equipment. Further, the electronic apparatus for switching column-by-column along the photocell matrix is neither illustrated nor described herein, inasmuch as suitable systems for this purpose are well known to those skilled in the art.

FIG. 6 shows an alternate construction for the photocell-carrying plates which can be used in a reader in place of the plates illustrated in FIG. 5 when it is desired to simultaneously detect all punched positions on the punched card rather than detect the positions in column-by-column sequence. With modifications which will be obvious to those skilled in the art, the plates 230 illustrated in FIG. 6 can be used in the basic card reader frame and accompanying apparatus illustrated in FIGS. 1 to 5.

Each of the plates 230 comprises an edge **230*a* along which the photocells 32 are mounted, square notches 230*b* cut out of the lower corners, a diagonally extending edge 230*c* and an edge 230*d* which is perpendicular to the base edge 230*a*. On one surface of each of the plates 230, as illustrated by the plate shown in full view in FIG. 6, are conductors 232*a*, 232*b*, 232*c*, etc. (illustrated by the solid lines in FIG. 6), and on the other surface are conductors 234*a*, 234*b* and 234*c*, etc. (illustrated by the broken lines). These conductors provide separate conductive paths between each photocell and points along the edge 230*d*** of the plate.

The two plates illustrated in FIG. 6 portray the arrangement of the plates as they are assembled in the reader. More particularly, in a manner similar to the staggering of the location of the sharp corner **44*d* of the plates 30 in the embodiment of FIG. 5, the vertical edges 230*d* along which the printed circuit conductors on the plate 230 terminate are located, alternately, on opposite sides of the reader. Thus, every other plate has its vertical edge 230*d* located on one side of the reader, while the remaining plates 230 have their vertical edges 230*d* at the other side of the reader. This arrangement considerably facilitates the connection of wires to and from each of the photocells 32 along the lower edge of the plates 230**.

As described above, the card reader thus has an array of photocells 32 disposed in a plane and arranged in columns and rows. The photocells 32 on each plate are spaced from each other such that one will overlie each punched position in a row of a standard IBM card, and the plates are spaced so that nearly all columns of the card are covered. A few columns adjacent the end of the card are, however, located outside of the array of photocells in the illustrated embodiment, but it will be understood that all positions could be readily accommodated by adding additional photocell-carrying plates 30. Any number of columns can be read by providing as many or as few plates 30 as required. Various groupings of photocel-carrying plates 30 can also be provided.

The punched card to be read, which is designated in the drawings by the reference numeral 60, is received in a receptacle located below the array of photocells. The upper wall of the receptacle is a flexible, transparent sheet of Mylar 62 which is fastened to the inner surface of the front frame member 16, extends rearwardly, over substantially the entire length of the array of photocells, and is located immediately below the photocells. As best illustrated in FIG. 4, the sheet 62 is provided with spaced-apart opaque strips 66 between the rows of photocells to restrict the communication of light coming through one of the punched holes in the card to either of the photocells in the columns on either side of it. In cooperation with the fish paper strips 42 positioned between the plates 30, the sheet 62 effectively masks the photocells from each other, both in the direction of the rows and in the direction of the columns of the card. The sheet 62, which is unattached along the plane of the array of photocells, simply rests on the top of the punched card and provides not only light masking but physical protection for the photocells.

A mask 64 forms the lower wall of the punched card receptacle. The mask 64 is a relatively thick plate of the same resin impregnated fiberglass material of which the photocell carrying plates 30 are fabricated and is attached to the lower edges of the frame members 12, 14 and 16 by screws 68. A triangular shaped corner piece 65 is secured to the upper surface of the mask 64 to block the movement of the punched card completely into the receptacle except when the diagonal corner of the card is properly located. On the upper surface of the mask 64 is a copper coating 70 which has been photo-etched, exposure of the resist being made through an IBM card punched with holes in all punch positions, to provide openings 71 in the copper corresponding in size and location to the IBM card punched holes. Light is thus permitted to pass only through openings in the copper; the copper provides not only masking but an excellent physical surface for the card receptacle.

A card 60 to be read is inserted manually into the receptacle defined between the sheet 62 and the masking plate 64. Beveled surfaces are provided on the upper surface of plate 64 and the lower surface of the frame member 16 to facilitate inserting the card. The card slides freely along the copper surface on the plate 64 and engages a pair of spaced-apart pins 72 which extend through the rear end frame member 18 and project a short distance into a card receptacle. The pins 72 are resiliently urged into the receptacle by springs 74. Another pin 76 extends through the frame 18 adjacent the unnotched corner of the card. The pin 76 is coupled to a microswitch 78 (FIG. 3) mounted outside the end frame member 18. The microswitch is adjusted so that it is closed only when the punch positions of the card are precisely aligned with the openings 71 in the copper coating 70 of the masking member 64.

The closing of the microswitch 78 energizes a solenoid 80 which moves a card clamp 82 into engagement with the card and holds it in position in the receptacle. The card clamp 82 is an aluminum or plastic box which overlies substantially the entire upper surface of the punched card reader and therefore serves as a cover. It includes a rectangular top 84 and downturned side flanges 86 and rear flange 89. The clamp 82 is pivotally mounted on the reader frame by screws 88 inserted through the side flanges 86. The armature 90 of the solenoid 80 is attached by a cotter pin 92 to the rear flange 89. Projecting downwardly from the under surface of the top portion 84 is a clamping piece 94 which engages the end of the punched card upon downward movement.

When there is no card in the receptacle, the microswitch 78 is open and the solenoid coil de-energized. When the card is properly positioned in the receptacle and closes the microswitch, the solenoid is energized and pulls the armature 90 downwardly, thereby pivoting the card clamp in a direction which moves the clamp piece 94 downwardly into engagement with the end of the card. When the solenoid 80 is de-energized, the weight of the front end of the card clamp pivots it in a direction which lifts the clamp piece 94 out of engagement with the card. The spring-loaded pins 72 then push the card partly out of the receptacle so that it may be manually removed.

The light source for the card reader comprises lamps 100 installed in the flanges **20*b* and 22*b* of the side members 20 and 22 of the frame. The lamps 100 pass through holes 102 in a panel 104 of light conducting material, such as Lucite, and serve to attach the panel to the frame. Light from the lamps 100 radiates outwardly and is diffused across the surface of the panel 104. A reflective material coats the lower surface of the panel 104** and thereby reflects light upwardly toward the photocells. The panel provides substantially uniform illumination for all photocells in the array.

Referring to FIG. 7, the electrical circuitry for the card reader includes a suitable power source 110 which is connected through a normally closed pushbutton switch 112 and the microswitch 78 to the card clamp solenoid 80, to the photocells 30 and to the lamps 100, the connection to the lamps 100 being through a photocell signal regulator 114. It will be understood that separate power sources may be provided for the several elements which are electrically energized and that the block diagram of FIG. 7 is simplified to facilitate an understanding of the invention. Those skilled can readily provide the details of the circuitry.

An important feature of the card reader is the photocell signal regulator 114. The regulator 114 is, basically, a voltage amplifier and adjusts the intensity of the lamps 100 in accordance with the output signal of a particular photocell, such as the one designated **30*a* in FIG. 7, in the photocell array. The punch position in the card which is aligned with the photocell 30*a* in the array is always punched so that the photocell 30*a* is illuminated. If the signal from the photocell 30*a* is below a predetermined magnitude, the photocell signal regulator 114 increases the intensity of the lamps 100. Conversely, if the signal is higher than a predetermined value, the regulator 114 reduces the intensity of the lamps 100. An optimum signal level, which may be preestablished by a rheostat in the circuitry of the photocell 30*a*, is maintained constant regardless of other conditions. The regulator 114 thus compensates for the dimming of the lamps with age, a burnout of one or more of the lamps during operation, which otherwise might go undetected and might create error in the readout, and changes in the sensitivity of the photocells due to variations in temperature, the intrusion of moisture, age and the like. Adjustment of the signal of the sample photocell 30*a*** enables a balance between the least and most sensitive photocells in the array to be established so that optimum signal levels from all photocells are obtained.

The punched card reader operates in the following manner. A punched card 60 to be read is inserted into the receptacle through the slot at the front end of the reader frame and is pushed in until the microswitch 78 is closed, thereby actuating the card clamp. The clamp is pivoted and the clamp piece grips the end of the card and holds the card in place. If the user has not inserted the card properly and, for example, it is upside down or backwards, it cannot be inserted all the way into the receptacle, because of the corner piece 65, and the microswitch pin 76 will not be engaged by the card. The card will continue to be ejected by the spring-loaded pin 72. In addition, circuitry can be provided in the reader to read out a coded column on the card and to prevent an improperly inserted card from being read.

The closing of the microswitch 78, in addition to clamping the card in place in the receptacle, energizes the photocells and turns on the lamps. It will be understood, however, that the lamps may be kept on continuously, if desired. The intensity of the lamps is adjusted by the regulator 114. The card reader is then ready for the information to be read out and supplied to data processing equipment or the like. As will be understood by those skilled in the art, the ancillary circuitry used with the card reader may be arranged to automatically read out the information when the card is in place and the photocells illuminated. When the readout is completed, the card is released and partially ejected by pressing the normally closed pushbutton switch 112. When the switch 112 is opened, the electrical circuit to the card clamp solenoid is broken, thereby permitting the card clamp to pivot out of engagement with the card. The spring loaded pins 72 push the card partway out so that it may be removed from the receptacle. The card clamp can, alternatively, be released automatically after readout or upon a programmed instruction from the computor by substituting a normally closed relay for the switch 112. Upon a signal from the readout switching circuits or the computor, the relay is opened, thereby releasing the clamp and permitting the card to be ejected by the spring-loaded pins.

The punched record reader of the invention can be constructed at relatively low cost, and because it has only one moving part, the card clamp, is substantially maintenance free. It is reliable and efficient in operation. For example, it will operate even when one or two lamps are burned out because the illumination is controlled by the photocell output. The novel construction features, particularly the photocell plates and mounting arrangement, enables adaptation to many purposes by providing a photocell array having a specifically required pattern. The photocells can be closely spaced, as indicated by the arrangement for IBM cards in the exemplary embodiment.

The above described embodiment of the invention is merely exemplary, and many modifications and variations of it may be made by those skilled in the art without departing from the spirit and scope of the invention. All such variations and modifications are intended to be within the scope of the invention as defined in the appended claims.

We claim:

1. A punched record reader comprising a plurality of plates of electrically nonconductive material, means supporting the plates in substantially parallel spaced-apart relation with corresponding edges lying in a plane, a plurality of spaced-apart photocells on the said corresponding edges of each of the plates and arranged to be in register with the information locations on a punched record when it is positioned adjacent the said plane, the photocells being elongated spaced-apart deposits of photoconductive material disposed with their longer axes aligned with the edges of the plates, a first array of conductors on one surface of each plate and a second array of conductors on the opposite surface of each plate, a conductor of the first array being connected to one longitudinal end of each photocell and a conductor of the second array being connected to the other longitudinal end of each photocell, means defining a receptacle adjacent the said plane for receiving the punched record, means for retaining the record in a fixed predetermined position in the receptacle while the information thereon is detected and light source means for illuminating the photocells through the opening in the punched record.

2. A reader according to claim 1, wherein each plate includes a diagonal edge spaced from said corresponding edge, the plates being mounted so that the diagonal edges are staggered on opposite sides of the receptacle.

3. A reader as defined in claim 2, wherein the first array of conductors includes a conductor extending from each photocell to spaced-apart first points on one edge of the plate, the second array of conductors includes a common element extending along the plate to a point spaced from said diagonal edge and an element connecting each photocell to the common element, a common bus wire connecting corresponding first points of all plates.

4. A reader as defined in claim 2, wherein the first and second array of conductors each include a conductor extending from each photocell to spaced-apart points on the edge of the card opposite the diagonal edge.

5. A reader according to claim 1, wherein the card retaining means includes a card gripping means comprising a card clamp which includes a pivotally mounted member having a projecting portion for engaging an edge in the card and means for selectively pivoting the member into a position wherein the gripping portion engages the card.

6. A reader according to claim 5 comprising control means responsive to the positioning of a card in the receptacle for operating the said pivoting means.

7. A reader according to claim 5, wherein the pivotally mounted member includes a portion on the opposite side of the axis about which it pivots from the card engaging portion thereof having a mass and a center of gravity sufficient to normally maintain the card gripping portion out of engagement with the card.

8. A reader according to claim 7, wherein the card engaging means is positioned between the pivoting means and the pivot mounting.

9. A reader according to claim 8, wherein the pivotally mounted member overlies and protects the photocell carrying plates.

10. A reader according to claim 1 including means for continuously maintaining a predetermined photocell signal level.

11. A reader according to claim 10 wherein the photocell signal level-maintaining means includes means responsive to the signal from one of the photocells in the array for controlling the intensity of the light from the light source.

12. A reader according to claim 11 wherein the photocell signal level-maintaining means includes means for adjusting the control signal of the said one photocell.

13. A reader according to claim 1, wherein the plate supporting means include a generally rectangular frame having spaced-apart slots in one pair of opposite sides for receiving the edges of the cards, and rods supported in the other pair of opposite sides of the frame and extending through the plates.

14. A reader according to claim 13 comprising substantially opaque elements carried by the rods and disposed between the plates to restrict the communication of light between the photocells on adjacent pairs of plates.

15. A reader according to claim 1 wherein the light source means includes a lighting panel providing substantially uniform intensity light for all photocells.

References Cited

UNITED STATES PATENTS 3,042,806 7/1962 Lubin ---------- 250—219 X

DARYL W. COOK, Primary Examiner

U.S. Cl. X.R.

250—219